April 9, 1935.   A. A. LEDOUX   1,997,002
LIQUID LEVEL GAUGE
Filed Nov. 1, 1933    2 Sheets-Sheet 2
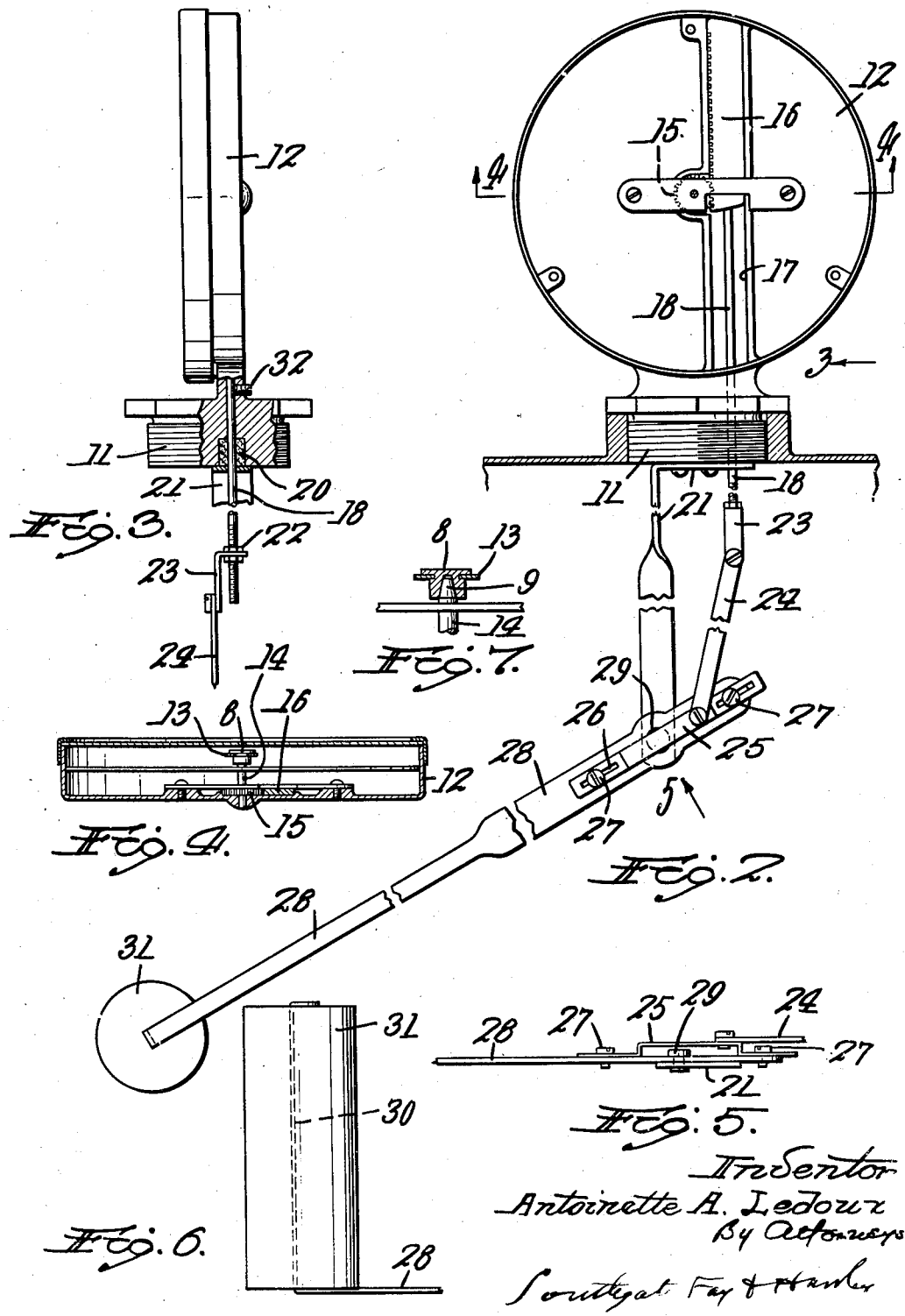
Inventor
Antoinette A. Ledoux
By Attorneys
Southgate Fay & Hanker Patented Apr. 9, 1935

1,997,002

UNITED STATES PATENT OFFICE 1,997,002

LIQUID LEVEL GAUGE

Antoinette A. Ledoux, Worcester, Mass.

Application November 1, 1933, Serial No. 696,232

4 Claims. (Cl. 73—82)

The principal objects of this invention are to provide a tank, such as an oil tank, with a gauge which can be adjusted to provide for a full rotation of the gauge pointer, that is, throughout a substantially complete circle, irrespective of the height of the tank; to provide an adjustment by which the rotation of the pointer can be adjusted to rotate through substantially a complete circle, irrespective of the throw of the float from the bottom to the top of any specific tank, and to provide means whereby as the gauge is being inserted in the tank the float can be held in a predetermined position so that it can be introduced into a tank containing oil without any hindrance from the float itself and then the float can be released very easily from the outside of the tank and will work automatically thereafter.

Other objects and advantages of the invention will appear hereinafter.

Reference is to be had to the accompanying drawings, in which

Fig. 2 is a corresponding view on enlarged scale of the inside of the gauge, the cover being removed, but showing the float connections;

Fig. 3 is a side view taken in the direction of the arrow 3 in Fig. 2;

Fig. 4 is a sectional view of the gauge on the line 4—4 of Fig. 2;

Fig. 5 is a bottom plan, taken at an angle, as indicated by the arrow 5, of the adjusting feature, and Fig. 6 is a plan of the float.

Fig. 7 is a detail view of the mounting for the pointer.

Figure 1:
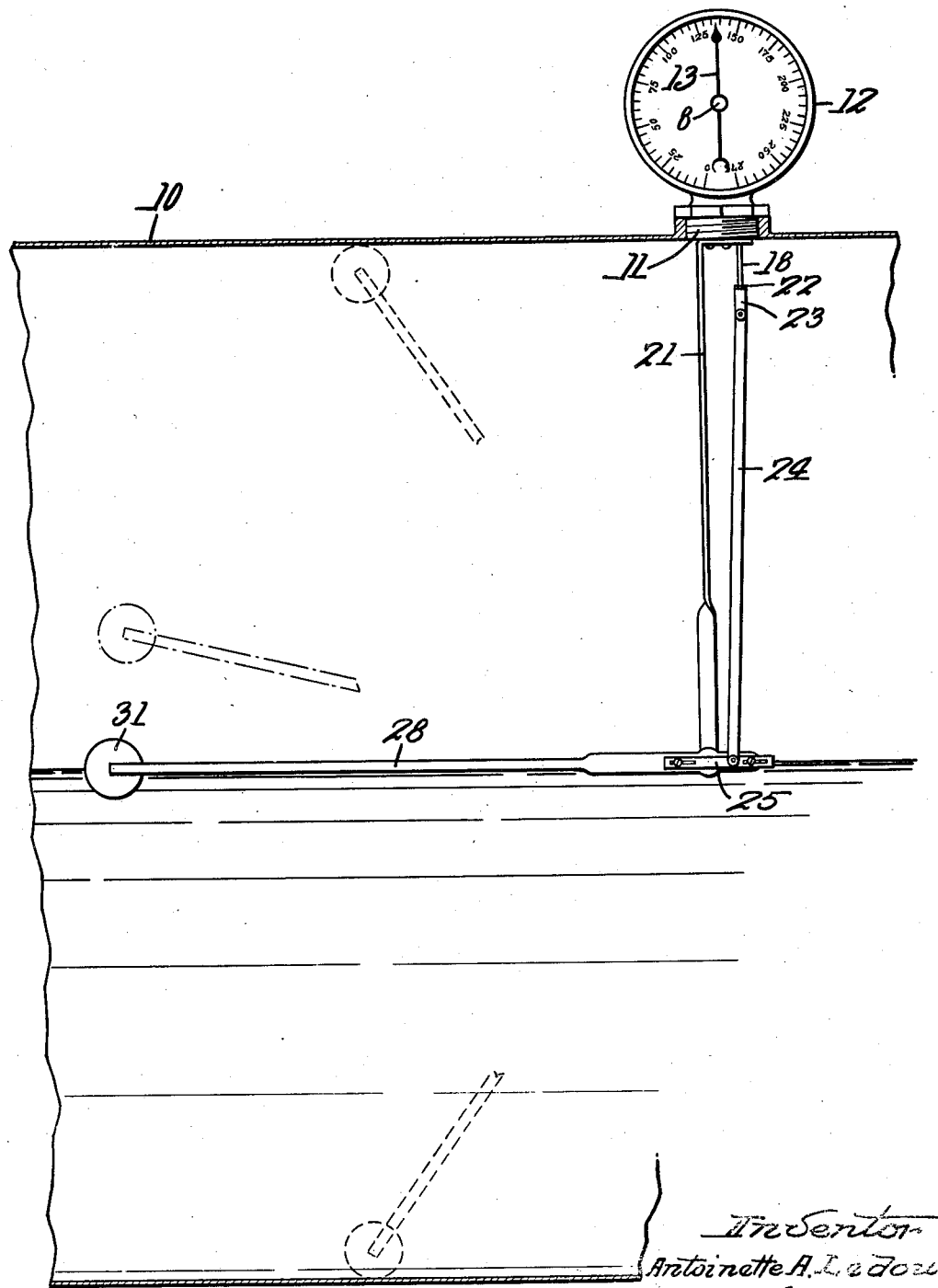
Fig. 1 is a sectional view of a tank, shown as half full of oil or other liquid, with a preferred embodiment of this invention applied thereto.

In different States it is either obligatory or customary to have tanks for road oil and other oils, and in fact other liquids of different heights. This presents a difficulty in providing a gauge, working on the float principle, in which the float moves from the bottom surface of the tank to the top surface that will work properly when applied to all tanks.

By this invention that difficulty is avoided. The invention is shown as applied to a tank 10 and with this tank is employed a screw plug 11 having upon it the gauge 12. This gauge as used, is provided with a scale and with a pointer 13 operating on the scale and mounted on a shaft 14. The shaft 14 is provided with a conical end 9 on which fits a hub 8 which carries the pointer 13. The pointer hub is frictionally mounted on the shaft therefore and can be adjusted by removing it and replacing it.

On the shaft 14 is a pinion 15 meshing with a vertically reciprocable rack 16, which rack is guided in vertical ways 17, as usual. The rack is provided with an operating rod 18 extending down from it through an opening in the plug 11. In this opening is a felt washer 20 to prevent the entrance of oil into the gauge. Below the felt washer is a bracket 21 which is secured to the bottom of the plug and extends straight downwardly to substantially the center of the tank.

The rod 18 is provided with an adjusting nut 22 and washer operated by turning a bracket 23 to which is pivotally connected a link 24. This link 24 is pivotally connected to an adjustable slide 25 which is provided with two longitudinal slots 26. Screws 27 pass through these slots and into a float arm 28 so that the slide 25 can be loosened and adjusted. The float arm 28 is pivotally mounted at 29 on the bottom of the bracket 21. At its end it is provided with a transverse or integral shaft 30 on which a float 31 is either loosely or fixedly mounted.

In the metal of the plug 11 is a set screw 32 which can be screwed up against the rod 18 to hold it in a fixed position when this is desired. To insert the device in the tank the screw 32 is first screwed up so as to hold the arm 28 in a horizontal position when it is finally put in position. The parts that are to go into the tank can be introduced in an obvious way and, as the gauge and plug have to be rotated in order to screw up the parts to a tight position, the float is much less likely to cause trouble on account of its being held in a fixed position with respect to its supporting bracket 21. The surging of the oil in the tank will not displace the float and spoil any adjustment of the gauge. When this has been accomplished, the screw 32 can be loosened from outside and the device is ready to work.

The adjustment by means of the screws is naturally a rather rough adjustment and after the parts are assembled in this way the pointer 13 can be removed, or rather the hub 8, from the conical end of the shaft 9 and turned slightly in either direction so that the pointer will have a full range from zero to whatever the opposite number on the scale happens to be.

Before inserting the mechanical parts, it is necessary to find out the height of the tank and the range of operation of the float 31. Then the two screws 27 can be loosened and the slide 25 adjusted so that when the float moves from the bottom to the top of the tank the pointer 13 will move from zero to the mark at the other end of the scale. This, of course, is done as the parts are placed in the tank and can be done by measurement before putting them to the test because, as stated, I have a finer adjustment that can be made after the parts are all put in position and the tank is in working condition.

This constitutes a simple way to make a rough adjustment for tanks of different heights and permits the use of the same gauge on all tanks.

Although I have illustrated and described one form of the invention, I am aware of the fact that modifications can be made therein by any person skilled in the art without departing from the scope of the invention as expressed in the claims. Therefore, I do not wish to be limited in this respect, otherwise than as set forth in the claims, but what I claim is:—

1. In a gauge operating device, the combination with a reciprocatory operating rod for the gauge, a link pivotally connected thereto, a fixed bracket, a float arm pivotally connected with the bracket, a float on the arm, an adjustable slide on the float arm arranged to be adjusted in the direction of the length of the arm, and means for permanently but pivotally connecting said link to the adjustable slide.

2. In a gauge operating device, the combination with a reciprocatory operating rod for the gauge, a link pivotally connected thereto, a fixed bracket, a float arm pivotally connected with the bracket, a float on the arm, an adjustable slide on the float arm arranged to be adjusted in the direction of the length of the arm and passing over the pivotal point of the float arm, and means for connecting said link to the adjustable slide, whereby the motion of the operating rod for the gauge will be controlled by the adjustment of the slide along the float arm.

3. In an operating device for a gauge, the combination of a reciprocatory rod for operating the gauge directly, a bracket adjustable along said rod, a link pivotally connected with the bracket, a slide to which the link is pivotally connected, a float arm pivoted at a stationary point, said slide being adjustably mounted on the float arm to move longitudinally thereon, and a float on the end of the float arm, whereby the adjustment of the slide and therefore the pivotal connection therewith of the link will adjust the throw of the gauge rod.

4. The combination with a plug adapted to be placed in the opening of a tank, a gauge carried by the plug and an operating rod for the gauge, of a felt washer on the inside of the plug for protecting the operating rod from the passage of liquid therearound, a set screw on the outside of the gauge for engaging the rod and holding it in fixed position, a pivoted float arm having a float thereon, and means for connecting the operating rod to said float arm, whereby the operating rod can be secured in fixed position to hold the float arm in a predetermined position while the gauge is being applied to a tank.

ANTOINETTE A. LEDOUX.